United States Patent [19]

Hahn et al.

[11] Patent Number: 4,983,332

[45] Date of Patent: Jan. 8, 1991

[54] METHOD FOR MANUFACTURING HYDROPHILIC CONTACT LENSES

[75] Inventors: Dennis Hahn; Gary A. Johansson, both of Rochester; Dominic V. Ruscio, Webster; Christopher E. Blank, Rochester, all of N.Y.

[73] Assignee: Bausch & Lomb Incorporated, Rochester, N.Y.

[21] Appl. No.: 397,143

[22] Filed: Aug. 21, 1989

[51] Int. Cl.$^5$ .............................................. B29D 11/00
[52] U.S. Cl. ...................................... 264/1.1; 264/2.3
[58] Field of Search ........................... 264/2.3, 1.1, 334

[56] References Cited

U.S. PATENT DOCUMENTS 2,542,386  2/1951  Beattie ................................. 264/2.3
4,146,696  3/1979  Bond et al. ........................... 264/2.3
4,534,916  8/1985  Wichterle ............................ 264/2.3

Primary Examiner—James Lowe
Attorney, Agent, or Firm—Christopher E. Blank; Craig E. Larson; Bernard D. Bogdon

[57] ABSTRACT

An improved method for manufacturing contact lenses wherein monomer or comonomer mixture is placed into a mold caivty and subjected to polymerization conditions to form a polymerized shape of desired shape wherein the improvement comprises the inclusion of a release agent in the monomeric mixture wherein said release agent comprises less than about three weight percent of said monomeric mixture and is chosen from a mixture of hydrophilic polymers with lipophilic compounds.

4 Claims, No Drawings

METHOD FOR MANUFACTURING HYDROPHILIC CONTACT LENSES

BACKGROUND OF THE INVENTION

Contact lenses are generally produced by one of three general techniques—lathing, molding or spin-casting. Each technique has its advantages and disadvantages. For instance, lathing involves forming the anterior and posterior portion of the lens by cutting both surfaces from a disc of lens material. This technique is the most costly of the three manufacturing techniques but affords certain design freedoms not otherwise readily available using molding or spin casting.

Molding and spin-casting form the lens with few further processing steps. In both techniques, the anterior and posterior surfaces are formed in one step. Molding accomplishes this result by providing two mold surfaces which define the anterior and posterior of the lens. The spin casting process forms the anterior surface by providing a mold surface and the posterior surface by the forces generated by spinning the liquid monomer. Both techniques allow lower cost production of contact lenses than lathing due to the lower labor contact required to produce finished lenses.

However in both the spin-casting technique and in the molding technique, the lens adheres to the mold surface. This phenomena is an inevitable consequence of the spin-casting and the molding process and obvious because of the chemical interaction between the mold surface and the monomer mixture as the monomer is polymerized. Normally, this lens/mold interaction is overcome by hydrating the lens material which has the effect of weakening the interaction between mold and lens and also gently pulls the lens from the mold. Thus, the lens is in its soft form when it is first removed from the mold.

Cast contact lenses are rigorously inspected after casting to insure their optical performance and to avoid cosmetic effects and edge defects. These inspections are difficult to accomplish with soft lenses and requires significant labor to accomplish. Xerogel lenses (nonhydrated or hard lenses) are more readily inspected. Therefore, the cost of producing hydrogel lenses could be reduced by releasing hard lenses from the mold, inspecting the hard lenses and then hydrating the lenses until they had become hydrogels.

Various attempts have been made to release soft contact lenses from molds in their dry state. For instance, U.S. Pat. No. 2,542,286 teaches adding "lubricant" to optical devices made from resins.

U.S. Pat. No. 3,171,869 describes a method for releasing plastic lenses which comprises polymerizing the resin to a gel like state at 25° C. to 125° C. and then heating the gel to 125° C. to 235° C. until the hardened resin is formed.

U.S. Pat. No. 3,944,637 teaches using a specific comonomer mixture to achieve release from the mold. These three patents describe methods for releasing lenses from glass molds. Modern contact lens manufacturing is done in plastic molds as is evident from the teachings of U.S. Pat. No. 4,155,962 which teaches a method for releasing a xerogel lens from a mold container by applying force against the sides of the mold.

U.S. Pat. No. 4,159,292 teaches a method for controlling the release of contact lenses from plastic molds by providing the mold material with an internal lubricant.

U.S. Pat. No. 4,534,916 teaches adding surfactants to the comonomer to produce lenses with improved surface quality lenses. The use of such surfactants decreases the number of surface defects on the lens. The examples show that the lenses were removed from the molds in spincasting.

SUMMARY OF THE INVENTION

The present invention relates to an improved method for manufacturing contact lenses, the improvement being related to releasing lenses from their molds without hydrating the lens to a hydrogel state. This improvement is accomplished by providing the comonomer mixture to be cast with from 0.001 to about 3 weight percent of a mixture of a hydrophilic nonreactive polymer and a lipophilic moiety such as a saturated or unsaturated fatty acid or alcohol. Upon polymerization of the lens in the mold to its hard xerogel state, the lens can be released in its nonhydrated form by distorting the plastic mold.

DETAILED DESCRIPTION OF THE INVENTION

Applicants have found that they can produce hard xerogel lenses which can be dry released from plastic molds by simply including in the monomer or comonomer mixture used to make the contact lens a mixture of a hydrophilic polymer and a lipophilic compound. Lenses made using this method are substantially equivalent to lenses made by state of the art methods with respect to their physical characteristics, but they have the advantage of having simplified post casting processing into finished lenses due to the fact that they are still in their hard state.

The mixture of hydrophilic polymer and lipophilic compound is effective in accomplishing effective dry release in the range of 0.01 to less than 5.0 weight percent. The preferable range is 0.01 to 1.0 weight percent. It has been found that the ratio of hydrophilic polymer to lipophilic compound by weight can range from 5/1 to 1/5. Most preferably, the ratio has been 4/1 to 1/1 by weight.

The hydrophilic polymers which have proven effective in the present invention include polyoxyethylene glycol, polyoxypropylene glycol. The average molecular weights of the hydrophilic polymers is in the range of 200 to 8,000 with the most preferred molecular weights being in the 2000 to 4000 range.

Other hydrophilic polymers may be used in the method of the invention as long as they do not reach in the polymerization process used to form the lens material and their solubility parameters are sufficiently close to the comonomer mixture and the final polymer to avoid heteraphasing that would cause opaque contact lenses.

The lipophilic compound used in the present invention are preferably chosen from the class of fatty acids and fatty alcohols. Specific examples include stearic acid, oleic acid, lauric acid, linolenic acid, palonitoleic acid, myristic acid, palmitic acid, arachidic acid, lignoceric acid and their alcohol functional analogs. Other lipophilic compounds can be used as long as they are relatively unreactive to the polymerization process employed to use the lens and they are used in small enough amounts to avoid heterophasing out of the monomer mixture during polymerization so as to cause opaque contact lenses.

The types of contact lens materials which may be used in the present invention are the whole range of "hydrogel materials". This includes polyhydroxyethyl methacrylate and polyvinyl pyrrolidinone based systems as well as the many copolymer formulations which employ hydroxyethyl methacrylate and/or vinylpyrrolidinone.

The use of the combination of hydrophilic polymer with lipophilic compound to improve contact lens production can be used in the spin-casting techniques and in molding techniques which employ two piece molds such as the techniques disclosed in U.S. Pat. No. 3,881,683; U.S. Pat. No. 4,197,2266; U.S. Pat. No. 4,121,896; or G.B. Pat. app. No. 2,185,933; and other casting and molding techniques known to be useful to form contact lenses.

The following examples illustrate specific embodiments of the invention but do not delineate the full and entire scope of the invention.

EXAMPLES

Example 1

Dry Release of pHEMA Lenses as Practiced In the Prior Art

A typical contact lens comonomer mixture of about 85 wt percent 2-hydroxyethylmethacrylate, 15 weight percent glycerin, 0.35 weight percent ethylene glycol dimethacrylate and 0.18 weight percent of the free radical catalyst benzoin methyl ether (BME) was spun cast into a contact lens using a plastic mold. Upon curing the lenses in the lens molds were dry released by distorting the plastic mold.

Less than 1% of the lens released without breaking or without other surface damage which rendered them commercially and clinically unacceptable.

Example 2

Attempted Dry Release of Lenses with Hydrophilic Polymer Added

To the prepolymer mixture used in example 1, various amounts of hydrophilic polymer were added. For instance, where 0.5 wt % of polypropylene glycol (m.w. of about 4000) was added to this mixture, and lenses were cast, there was improved dry-release of the lens. However, there remained a tendency of the lens to adhere to the center of the mold still.

Example 3

Dry Release of Lenses Cast Per Method of the Invention

All lens comonomer mixtures were the same as used in Examples 1 and 2 except 0.25 weight parts of the following mixture were added to the comonomer mixture:

A. 0.06 wt. pts. stearic acid/0.19 wt. pts. polyethylene m.w. 3000 glycol;
B. 0.06 wt. pts. succinic acid/0.19 wt. pts. polyethylene glycol m.w. 3000;
C. 0.06 wt. pts. stearic acid/0.19 wt. pts. polyethylene glycol m.w. 4000; and
D. 0.06 wt. pts. stearic acid/0.19 wt. pts. polyethylene glycol (m.w. 3300).

Lenses were cast in PVC molds and dry released. The lenses were then inspected per structural commercial methods and evaluated. Only lenses which released without breaking were inspected.

| Mixture | Lenses Cast | Lenses Inspected | Lenses Found Acceptable |
|---------|-------------|------------------|-------------------------|
| A | 25 | 19 | 10 |
| B | 25 | 15 | 9 |
| C | 25 | 24 | 19 |
| D | 23 | 23 | 23 |

This showed significant improvements over the lenses cast per Examples 1 and 2 which had effective yield rates of 0. Higher yield rates than state-of-the-art were obtained with polyethylene glycol alone-but required significantly higher concentration of the polymer.

As can be appreciated, the addition of the hydrophilic polymer and the lipophilic moiety increased the yield dramatically of dry releasing lenses.

We claim:

1. An improved method for manufacturing contact lenses wherein monomer or comonomer mixture is placed in a mold cavity wherein at least one surface is formed of polyvinylchloride polymer and subjected to polymerization conditions to form a polymerized shape wherein the improvement comprises the inclusion of a release agent in the monomeric mixture, wherein said release agent comprises less than about three weight percent of said monomeric mixture and is a mixture of a nonreactive polyoxyalkylene polymer and a fatty acid.

2. The method of claim 1 wherein the method employs monomeric mixtures chosen from the group consisting of N-vinyl pyrrolidinone, 2-hydroxyethyl methacrylate, methylmethacrylate, methacrylic acid, and acrylic acid.

3. The method of claim 1 wherein the nonreactive polyoxyalkylene polymer is chosen from the group consisting of polyethylene gylcol with average molecular weights between about 200 and about 8000 and polypropylene glycol with average molecular weights between about 200 and about 8000.

4. The method of claim 1 wherein the fatty acid is chosen from the group consisting of oleic acid, linolenic acid, palonitoleic acid, aluric acid, myristic acid, palmitic acid, steraic acid, arachidic acid and lignoceric acid.

* * * * *